United States Patent [19]
Tinnerman

[11] 3,798,710
[45] Mar. 26, 1974

[54] SHEET METAL PANEL FASTENER

[76] Inventor: George A. Tinnerman, 3600 Stewart Ave., Miami, Fla. 33133

[22] Filed: Feb. 9, 1973

[21] Appl. No.: 330,959

[52] U.S. Cl.............................. 24/73 B, 52/506, 85/36
[51] Int. Cl..... E04b 1/40, A44b 21/00, F16b 17/00
[58] Field of Search......... 24/73 FT, 73 SC, 259 TF, 24/153 S, 90 F, 73 B; 52/361, 506, 714; 85/5 R, 36; 151/41, 75

[56] References Cited
UNITED STATES PATENTS

| | | | |
|---|---|---|---|
| 1,516,109 | 11/1924 | McBee | 85/5 R |
| 2,013,446 | 9/1935 | Reiter | 24/259 TF |
| 2,181,631 | 11/1939 | Tinnerman | 85/36 |
| 2,225,394 | 12/1940 | Tinnerman | 85/5 R |
| 2,578,008 | 12/1951 | Judd | 85/36 |
| 2,697,857 | 12/1954 | Eckel | 52/506 |
| 3,703,794 | 11/1972 | Gracon et al. | 52/506 |

Primary Examiner—Donald A. Griffin
Attorney, Agent, or Firm—Revere B. Gurley

[57] ABSTRACT

A sheet metal fastener for securing panels, especially of insulation material, to a supporting structure is formed in two parts, one part having a clip to secure to the supporting structure and a prong to penetrate the panel and pass through the second part, the other part being substantially washer-like with a pair of tongues slotted to receive the prong. The prong has teeth to engage the ends of the slot in the tongues, preventing withdrawal of the tongues through the washer-like part, and is bent over the second part to secure the two parts to the panel. The tongues are formed by slitting the sheet material of the second part and the material adjacent the slits may be upset to prevent the tongues being forced through the space in the washer-like part.

4 Claims, 3 Drawing Figures

PATENTED MAR 26 1974 3,798,710

SHEET METAL PANEL FASTENER

This invention relates to fasteners and especially resides in a fastener for securing a panel member to a support structure.

The fastening of panels, such as insulation panels, on a corrugated roof or deck presents a serious problem, as openings in the corrugated members may cause leaks, and welding for fasteners will destroy the coating on the corrugations. Under some circumstances, the panels are subjected to high wind pressure, so that the fasteners must provide both strength and security.

The object of this invention is to provide a sheet metal fastener which is simple to make and inexpensive, requires no modification of the corrugated supporting members and has the strength to secure the panels under all conditions.

The fastener shown is formed with a clip which embraces and grips a corrugation and may be quickly driven onto the corrugation. A prong is fixed on the base of the clip so it may extend through the panel, and a substantially flat, slotted member engages the opposite side of the panel with the tongue passed through a slot in the slotted member. The slotted member is formed with opposed tongues having notches which form the slot to engage teeth on the edges of the prong, so that the tongues are flexed out of the plane of the slotted member and the tongue is bent over to provide greater fastening strength.

DRAWINGS

Figure 1:
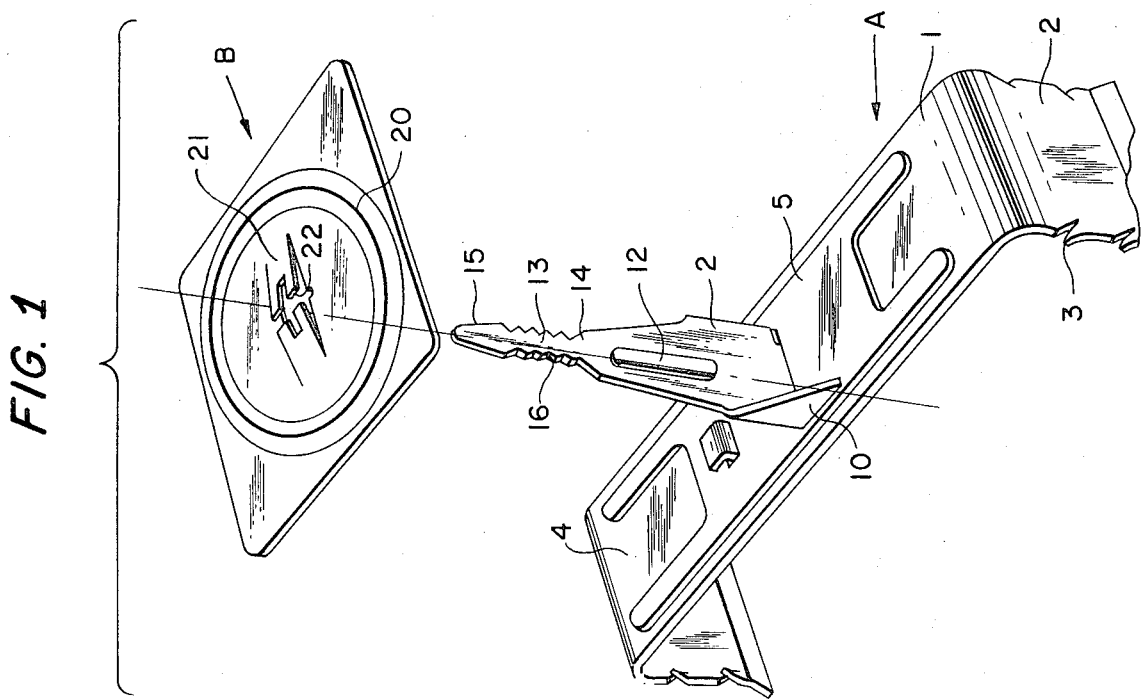
FIG. 1 is an exploded view of the fastening members before assembly.
Figure 2:
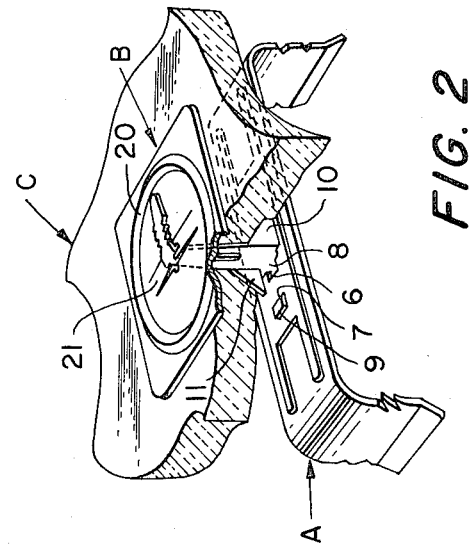
FIG. 2 is a broken away view of the fastener in position on a panel.

The sheet metal fastener of this invention consists of two elements A, B, between which a panel C is secured. Element A has a clip portion 1 to be fastened to a support and a prong 2 passing through the panel C. Element B is a substantially flat member to be placed on the opposite side of panel C, with a slotted formation through which prong 2 passes to secure the panel C.

The clip 1 in the specific form illustrated is designed to engage over corrugations of a corrugated structure and for that purpose is provided with flanges 2 having teeth 3, so that the clip may be pressed or driven over a corrugation with the teeth engaging the sides of the corrugation. This general structure is shown in Gracon and Tinnerman U.S. Pat. No. 3,703,794, and the same form of clip shown in that patent may be used in the fastener shown in this case.

The base 4 of the clip has a rib and panel formation 5 pressed in its base to provide strength and rigidity. In the center of the base the prong 2 is fixed to the clip in any convenient manner. As shown here, the base 4 has slots 6, 7 therein and the prong 2 has a laterally extending lug 8 which extends through slot 6 to slot 7 and then extends through slot 7, to be bent over at 9 to secure the prong to the clip. The body of the prong extends substantially at right angles to the base of the clip, a pair of flanges or wings 10, 11 extending in opposite directions from the edges of the body of the prong 2 and in engagement with the base to support the prong on the clip.

The prong 2 has a rib 12 pressed in its body for rigidity, and beyond the rib is reduced in width to form the narrow outer portion 13 with shoulders 14 at the base of the outer portion. This outer portion 13 is tapered or pointed at its end to provide for penetration of panel C, and on its opposite edges is notched to form a series of teeth 16 on each edge.

Element B may be a substantially flat washer-like formation, having a rib 20 pressed in its surface for strength, and a pair of opposed tongues 21 in its central area. These tongues are formed by slitting the sheet material outwardly from the center, with the ends 22 of the tongues in the center and the bases of the tongues outwardly from the center. The adjacent ends 22 have notches 23 extending outwardly from the ends 22, the notches together forming a complete slot to receive prong 2. The outer ends 24 of the notches are spaced less than the width of the outer portion 13 of prong 2, so that when the prong is pressed through the slot, the tongues are flexed out of the plane of the central area of the element B.

Normally, the prong 2 will pass through panel C with the panel abutting the base of the clip 1 and the element B engaging the shoulders 14 of the prong. The outer portion 13 is bent over against the element B, so that the element is held by the tooth engagement of the prong and by the bent-over portion. If thicker panels are to be fastened, the element B is pressed onto the prong against the thick panel until a pair of teeth engages the ends of the slot and is then bent over at that point.

Figure 3:
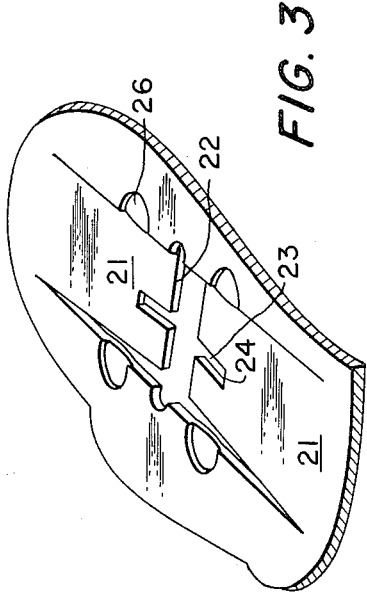
FIG. 3 is a fragmentary view of a portion of one fastening member.

Since the outer portion 13 is wider than the length of the slot, so that the tongues are flexed out of the plane of the fastener element, the tongues will offer greatly increased resistance to force on the prong tending to flex them through the plane of the element. This resistance is greatly increased by slightly upsetting the metal of the element adjacent the slits forming the tongues as shown at 26 in FIG. 3. The edges may easily be deformed by a punch, or may be depressed by stamping when the fastener is made. These upset portions narrow the space from which the tongues are formed, resisting the deflection of the tongues through the element.

This fastener is especially designed for use with panels of loosely formed material, such as insulation panels, but is equally adaptable to mesh or other materials. With slight modifications, the fastener may be used with panels of harder materials, and such fastener is within the scope of this invention. The clip may be of any form which will fasten to a support and may be modified for different types of support. The prong engagement with the washer-like element B provides a strong fastener especially adapted to secure panels subjected to igh winds and other severe forces.

I claim:

1. A fastener of sheet metal having a base for positioning on one side of an article to be fastened, and having a prong projecting from said base to extend through said article, a second member for positioning on the opposite side of said base and formed for said prong to pass through, said second member having a pair of opposed tongues with their ends adjacent, said tongues having slots in their ends to form a complete slot through which said tongue can pass, the opposite edges of the outer portion of said prong having teeth to engage said tongues at the bases of said slot, said outer portion of said prong being wider than the length of said complete slot so that said tongues are flexed outwardly from said article as said prong is forced through said slot, and said prong being bendable to be bent over against said second member to secure said second member against said article with said article between said members.

2. A fastener as claimed in claim 1, in which said prong has shoulders inwardly of said outer portion against which said tongues may abut.

3. A fastener as claimed in claim 1, in which said tongues are formed by slitting the metal of said second member, and the edges of said slits adjacent said tongues are upset to narrow the distance between said edges and prevent said tongues being flexed into said second member.

4. A fastener of sheet metal comprising a base member for positioning on one side of a panel to be fastened and having clip means for securing to a support, a second member for positioning on the opposite side of said panel, said second member having a substantially flat area with a pair of opposed tongues having their ends adjacent and having notches extending from said ends to form a complete slot, said base member having a prong extending outwardly with an outer portion having a tapered end for piercing a panel and teeth on opposite edges adjacent said end to engage the edges of said tongues at the ends of said slot, said prong being wider between said teeth than the length of said slot so that said tongues are flexed outwardly as said prong is passed through said second member, the portion of said prong between said outer portion and said base being wider to provide shoulders against which said tongues may abut, said outer portion of said prong being bendable over against said second member to secure said two members together more firmly with said panel between them.

* * * * *

UNITED STATES PATENT OFFICE
CERTIFICATE OF CORRECTION

Patent No. 3,798,710        Dated March 26, 1974

Inventor(s) GEORGE A. TINNERMAN

It is certified that error appears in the above-identified patent and that said Letters Patent are hereby corrected as shown below:

Column 2, line 64, (Claim 1, line 9 thereof)

"tongue" should read -- prong --.

Signed and sealed this 30th day of July 1974.

(SEAL)
Attest:

McCOY M. GIBSON, JR.
Attesting Officer

C. MARSHALL DANN
Commissioner of Patents